US012792368B2

(12) United States Patent
Yu et al.

(10) Patent No.: US 12,792,368 B2
(45) Date of Patent: Nov. 10, 2026

(54) ONE-MACHINE MULTI-CONTROL METHOD, APPARATUS, SYSTEM AND ELECTRONIC DEVICE

(71) Applicant: NETEASE (HANGZHOU) NETWORK CO., LTD., Hangzhou (CN)

(72) Inventors: Zexi Yu, Hangzhou (CN); Hongqi Liu, Hangzhou (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 779 days.

(21) Appl. No.: 18/001,077

(22) PCT Filed: Oct. 30, 2020

(86) PCT No.: PCT/CN2020/125574
§ 371 (c)(1),
(2) Date: Dec. 8, 2022

(87) PCT Pub. No.: WO2021/248788
PCT Pub. Date: Dec. 16, 2021

(65) Prior Publication Data

US 2023/0214243 A1 Jul. 6, 2023

(30) Foreign Application Priority Data

Jun. 10, 2020 (CN) ......................... 202010526846.4

(51) Int. Cl.

| | |
|---|---|
| ***G06F 9/451*** | (2018.01) |
| ***G06F 3/0488*** | (2022.01) |
| ***G06F 11/3668*** | (2025.01) |

(52) U.S. Cl.
CPC ............ *G06F 9/452* (2018.02); *G06F 3/0488* (2013.01); *G06F 9/451* (2018.02);
(Continued)

(58) Field of Classification Search
CPC ........ G06F 9/452; G06F 3/0488; G06F 9/451; G06F 11/3688; G06F 2203/04104;
(Continued)

(56) References Cited

U.S. PATENT DOCUMENTS

2011/0261000 A1* 10/2011 Batara ................ G06F 3/04883 345/173
2013/0210525 A1 8/2013 Sizelove et al.
(Continued)

FOREIGN PATENT DOCUMENTS

CN 102123132 A 7/2011
CN 105808425 A 7/2016
(Continued)

OTHER PUBLICATIONS

1st Office Action dated Jan. 27, 2021 of Chinese Application No. 202010526846.4.
(Continued)

*Primary Examiner* — Peng Ke
(74) *Attorney, Agent, or Firm* — Qinghong Xu

(57) ABSTRACT

A one-machine multi-control method is provided. The method is applied to a master control terminal, including: in response to a touch operation on a graphical user interface of the master control terminal, converting an operation event corresponding to the touch operation into an operation protocol packet by means of a master toolkit; and sending a message to a slave control terminal, the message carrying the operation protocol packet to trigger the slave control terminal to perform the touch operation on the basis of the operation protocol packet by means of a salve toolkit.

19 Claims, 5 Drawing Sheets

(52) U.S. Cl.
CPC .................... *G06F 11/3688* (2013.01); *G06F 2203/04104* (2013.01); *G06F 2209/545* (2013.01)

(58) Field of Classification Search
CPC ........... G06F 2209/545; G06F 3/03547; G06F 3/038; G06F 3/0383; G06F 2203/04808; G06F 3/04883; G06F 2203/0383
See application file for complete search history.

(56) References Cited

U.S. PATENT DOCUMENTS

| | | | | |
|---|---|---|---|---|
| 2014/0055360 | A1 | 2/2014 | Liang | |
| 2014/0215443 | A1* | 7/2014 | Voccio | G06F 16/245 717/128 |
| 2015/0339136 | A1* | 11/2015 | Suryanarayanan | G06F 9/455 718/1 |
| 2017/0068424 | A1* | 3/2017 | Hong | H04N 13/30 |
| 2017/0177213 | A1* | 6/2017 | Yim | G04G 21/00 |
| 2019/0158975 | A1* | 5/2019 | Petersen | H04W 4/70 |
| 2020/0356509 | A1* | 11/2020 | Gosselin | G06F 1/266 |

FOREIGN PATENT DOCUMENTS

| | | | |
|---|---|---|---|
| CN | 105975367 | A | 9/2016 |
| CN | 111651232 | A | 9/2020 |

OTHER PUBLICATIONS

2nd Office Action dated Apr. 20, 2021 of Chinese Application No. 202010526846.4.
International Search Report dated Mar. 10, 2021 of International Application No. PCT/CN2020/125574.
Linux Programming Wars published by Xidian University Press on Dec. 2017.

* cited by examiner

ONE-MACHINE MULTI-CONTROL METHOD, APPARATUS, SYSTEM AND ELECTRONIC DEVICE

CROSS REFERENCE

The present disclosure is a U.S. national phase application of International Application No. PCT/CN2020/125574 filed on Oct. 30, 2020, which claims priority to Chinese Patent Application No. 202010526846.4, filed on Jun. 10, 2020 and entitled "ONE-MACHINE MULTI-CONTROL METHOD, APPARATUS, SYSTEM AND ELECTRONIC DEVICE", which are incorporated herein by reference in their entireties.

TECHNICAL FIELD

The present disclosure relates to the technical field of intelligent control, in particular to a one-machine multi-control method, a one-machine multi-control apparatus, a one-machine multi-control system and an electronic device.

BACKGROUND

Many terminal brands are provided currently with respect to the Android system in market at home, and each terminal brand has many different models of terminals. In addition, for each brand, new products will be launched every once in a while, which will lead to hundreds of Android system terminals in the market. These terminals have different models, resolutions, system versions, etc., bringing a lot of troubles to developers and testers working on mobile applications and games.

SUMMARY

The purpose of the present disclosure is to provide a one-machine multi-control method, a one-machine multi-control apparatus, a one-machine multi-control system and an electronic device.

In one aspect, embodiments of the present disclosure provide a one-machine multi-control method, which is applied to a master control terminal, wherein the master control terminal is deployed with a master toolkit, the master control terminal is connected with at least one slave control terminal, both the master control terminal and the slave control terminal are mobile terminals installed with an Android system, and the slave control terminal is deployed with a slave toolkit. The method includes: converting, in response to a touch operation on a graphical user interface of the master control terminal, an operation event corresponding to the touch operation into an operation protocol package through the master toolkit; and sending a message to the slave control terminal, the message carrying the operation protocol package, to trigger the slave control terminal to perform through the slave toolkit the touch operation based on the operation protocol package.

In another aspect, embodiments of the present disclosure provide a one-machine multi-control method. The method is applied to a slave control terminal, wherein the slave control terminal is deployed with a slave toolkit, the slave control terminal is connected with a master control terminal, both the master control terminal and the slave control terminal are mobile terminals installed with an Android system, and the master control terminal is deployed with a master toolkit. The method includes: receiving a message sent by the master control terminal, the message carrying an operation protocol package corresponding to a touch operation on the master control terminal; parsing the operation protocol package from the message; and performing simulation of an operation on a graphical user interface of the slave control terminal based on the operation protocol package.

In another aspect, embodiments of the present disclosure provide a one-machine multi-control apparatus, which is applied to a master control terminal, wherein the master control terminal is deployed with a master toolkit, the master control terminal is connected with at least one slave control terminal, both the master control terminal and the slave control terminal are mobile terminals installed with an Android system, and the slave control terminal is deployed with a slave toolkit. The apparatus includes: a conversion module configured to convert, in response to a touch operation on a graphical user interface of the master control terminal, an operation event corresponding to a touch operation into an operation protocol package through the master toolkit; and a sending module configured to send a message to the slave control terminal, the message carrying the operation protocol package, to trigger the slave control terminal to perform through the slave toolkit the touch operation based on the operation protocol package.

In another aspect, embodiments of the present disclosure provide a one-machine multi-control apparatus, which is applied to a slave control terminal, wherein the slave control terminal is deployed with a slave toolkit, the slave control terminal is connected with a master control terminal, both the master control terminal and the slave control terminal are mobile terminals installed with an Android system, and the master control terminal is deployed with a master toolkit. The apparatus includes: a receiving module configured to receive a message sent by the master control terminal, wherein the message carries an operation protocol package corresponding to a touch operation on the master control terminal; a parsing module configured to parse the operation protocol package from the message; and an operation simulation module configured to perform simulation of an operation on a graphical user interface of the slave control terminal based on the operation protocol package.

In another aspect, embodiments of the present disclosure provide a one-machine multi-control system, which includes a service device, and further a master control terminal and a slave control terminal, wherein the service device is communicated with the master control terminal and the slave control terminal.

The master control terminal is configured with the apparatus described in above aspects, and the slave control terminal is configured with the apparatus described in above aspects.

The service device is configured to push a master toolkit to the master control terminal and a slave toolkit to the slave control terminal, and start the master toolkit and the slave toolkit to realize synchronous simulation of a touch operation on the master control terminal by the slave control terminal.

In another aspect, embodiments of the present disclosure provide an electronic device, including a memory, a processor, and a computer program stored in the memory and capable of running on the processor. The processor is configured to implement the methods described in above aspects when executing the computer program.

In another aspect, embodiments of the present disclosure provide a computer-readable storage medium having a computer program stored thereon, and when the computer program is executed by a processor, the processor is configured to implement the method described in above aspects.

BRIEF DESCRIPTION OF THE DRAWINGS

In order to more clearly describe specific implementations of the present disclosure or technical solutions in the prior art, drawings needed to be used in the specific embodiments or the prior art description will be briefly introduced in the following. It is apparent that the drawings in the following description are only some embodiments of the present disclosure, and for those of ordinary skill in the art, other drawings can also be obtained from these drawings without creative efforts.

DETAILED DESCRIPTION

Figure 1:
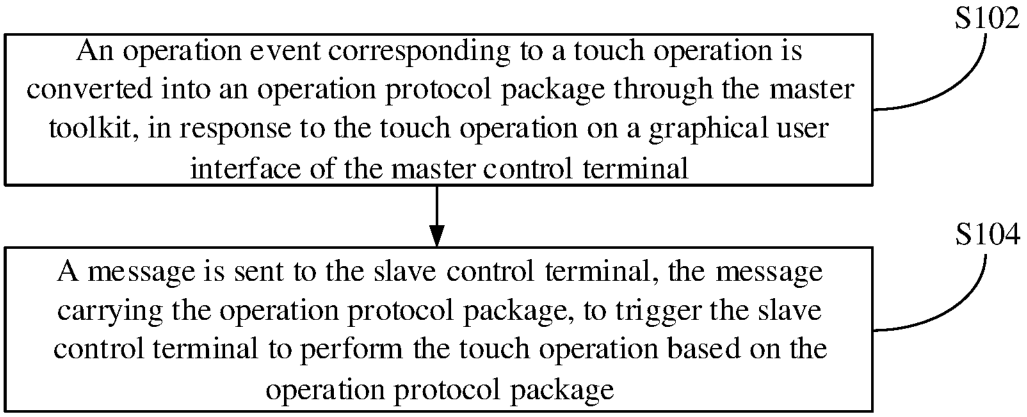
FIG. 1 is a flow chart of a one-machine multi-control method provided by embodiments of the present disclosure.

In order to make the purpose, solution and advantage of embodiments of the present disclosure more clear, technical solutions of the present disclosure will be described clearly and completely in the following in combination with the drawings. It is apparent that embodiments described herein are only part of embodiments of the present disclosure, not all of them. Based on the embodiments of the present disclosure, all other embodiments obtained by those skilled in the art without any creative efforts fall within the scope of the present disclosure.

In the current one-machine multi-control scheme, the Solopi scheme and the Total Control scheme are mainly included. Among which, design and implementation of the Solopi scheme is based on a recording and playback function. In the recording and playback scenario, user's operations are recorded on one device, and then the user's operation record is sent to any other device through the socket to realize the playback of the operations, so as to achieve controlling multiple devices through one device. In the implementation, a master machine and slave machines need to establish a socket connection, and the master machine sends the user's operation record to each slave machine in real time. The slave machine analyzes the operation record after receiving it, and then simulates the user's operations on the slave machine to complete the playback of the operation record.

In the Total Control scheme, interconnection between a computer and a terminal is realized through the USB/WIFI, so as to achieve uniformly control of the terminal at a computer end. Functions such as terminal information viewing, message prompt, one click access to the application where the message is located supported, and also functions such as script recording, automatic editing and execution, batch installation of applications through one click are supported. In the implementation, it is necessary to connect the terminal with the HUB through a USB cable, and the HUB is also connected with the computer through a USB cable. Then corresponding client applications are installed on the terminal, the computer, and a terminal screen is mapped to the computer, and a mouse can be used to operate the terminal on the computer, so as to achieve the multi-control.

Both these two common schemes mentioned above can realize the one-machine multi-control scheme. The Solopi scheme is implemented based on the recording and playback, thus it has a great operation delay. Before operations on the master machine by the user are completed, the slave machine will not have any response. Only when one operation is completed on the master machine, and the operation record is sent to the slave machine, the slave machine can make a corresponding response after analysis. The whole process takes a long time. Therefore, for some complex multi-touch operations, the parsing will be slower and the delay will be greater, which will seriously affect the actual use of the machine and the user experience. In addition, number of devices that can be supported is limited, which will also seriously affect the use of large-scale device clusters.

The Total Control scheme requires external hardware costs, including computers, HUBs, USB cables and other hardware. The more terminals there are, the better computer configuration is required. At the same time, there are certain requirements for compatibility between terminals and computers. Furthermore, in such scheme, the multi-control operations are performed through the computer1, and a computer mouse can only be used to simulate some single-touch operations, but cannot be used to simulate multi-touch operations. Therefore, such scheme does not support multi-touch operations, and it cannot be tested for some operations that require multi-touch operations.

The present disclosure provides a one-machine multi-control method, a one-machine multi-control apparatus, a one-machine multi-control system and an electronic device, which can effectively mitigate above technical problems.

In order to facilitate understanding of embodiments of the present disclosure, the one-machine multi-control method disclosed in embodiments of the present disclosure will be first introduced in detail.

In some possible embodiments of the present disclosure, a one-machine multi-control method is provided, which is applied to a master control terminal, on which a master toolkit is deployed. In some embodiments, the master control terminal can be a smart phone, a tablet computer, a handheld computer and other smart terminals installed with an Android operating system. The master control terminal is connected with at least one slave control terminal. Both the master control terminal and slave control terminal are mobile terminals installed with an Android system, and the slave control terminal is deployed with a slave kit.

As shown in FIG. 1, the flow chart of a one-machine multi-control method includes following steps.

In a step S102, an operation event corresponding to a touch operation is converted into an operation protocol package through the master toolkit, in response to the touch operation on a graphical user interface of the master control terminal.

In a step S104, a message is sent to the slave control terminal, the message carrying the operation protocol package, to trigger the slave control terminal to perform the touch operation based on the operation protocol package.

In embodiments, the above-mentioned master control terminal and slave control terminal are both mobile terminals installed with an Android system. Usually, in order to realize the one-machine multi-control method, it is necessary to establish a connection between the master control terminal and slave control terminal. In embodiments of the present disclosure, a master toolkit is deployed on the master control terminal in advance, a slave toolkit is deployed on the slave control terminal, and then a communication connection between the master control terminal and the slave control terminal is established through the master toolkit and the slave toolkit. The communication connection is usually realized by configuring corresponding function modules in the master toolkit and the slave toolkit. In preferred embodiments, both the master toolkit and the slave toolkit can be provided with an interface to realize communication. Preferably, the interface can be a ZeroMQ functional module. For example, the operation protocol is sent through a ZeroMQ message sending module configured in the master toolkit, and accordingly, the operation protocol is received through a ZeroMQ message receiving module configured in the slave toolkit. That is, the message sent from the master control terminal to the slave control terminal is the ZeroMQ message carrying the operation protocol package, so as to realize the connection between the master control terminal and the slave control terminal with ZeroMQ, so as to realize the simple and high-performance communication between the master control terminal and the slave control terminal. In actual use, in addition to the above-mentioned ZeroMQ function module, other interface protocol modules can be set in the master toolkit and the slave toolkit, which can be provided according to the actual use, and embodiments of the present disclosure do not limit this.

Furthermore, the master toolkit and the slave toolkit also include other functional modules, such as modules configured to obtain the device information of the master control terminal or the slave control terminal. Therefore, when a user performs the touch operation on the master control terminal, the master control terminal can execute above step S102 and step S104, and the slave control terminal can be controlled by the master control terminal, so as to achieve the purpose of multi-control by one machine.

Therefore, according to the one-machine multi-control method provided by embodiments of the present disclosure, the touch operation on the graphical user interface of the master control terminal can be responded, and the operation event corresponding to the touch operation is converted into the operation protocol package through the master toolkit. The message carrying the operation protocol package is sent to the slave control terminal to trigger the slave control terminal to perform the touch operation based on the operation protocol package. During above control process, since a communication connection between the master control terminal and the slave control terminal is directly established through the master toolkit and the slave toolkit, there is no additional hardware costs, and the deployment is simple and convenient. When the master toolkit is deployed on the master control terminal, there is no need to limit the model, resolution, or system version. Therefore, the method of the present disclosure has good scalability and compatibility, and can avoid testers from testing on different versions separately, which effectively reduces labor costs, and improves the testing efficiency.

In actual use, the connection between the master control terminal and the slave control terminal through the master toolkit and the slave toolkit is a wireless connection. In some implementations, the master control terminal and the slave control terminal are usually required to be in the same WiFi environment, or in a network environment with different WIFIs but can communicate with each other, so as to facilitate the implementation of above one-machine multi-control scheme.

Figure 2:
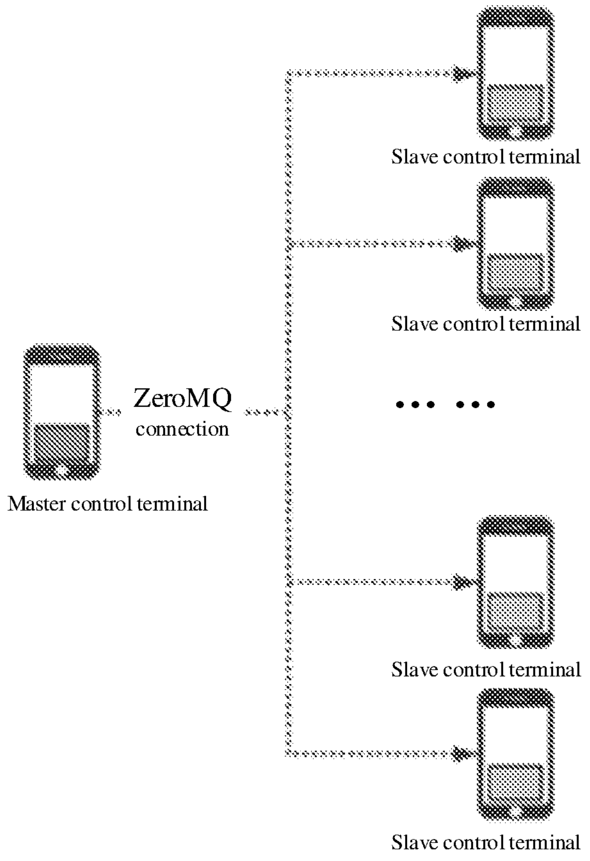
FIG. 2 is a schematic diagram of connection of a one-machine multi-control scheme provided by embodiments of the disclosure.

Further, for ease of understanding, FIG. 2 shows a schematic diagram of the connection of the one-machine multi-control scheme. As shown in FIG. 2, a master control terminal and a plurality of slave control terminals are included. A block in the master control terminal in FIG. 2 represents the master toolkit, a block in the slave control terminal represents the slave toolkit, and a dotted line connecting the master control terminal and the slave control terminal represents the wireless connection. For ease of explanation, in FIG. 2, a limited number of slave control terminals is taken as an example for explanation. In actual use, the number of slave control terminals can be provided according to the actual use, and embodiments of the present disclosure do not limit this.

Furthermore, in order to establish communication between the master control terminal and the slave control terminal, the master toolkit and the slave toolkit are pre deployed on the master control terminal and the slave control terminal through a service device. Therefore, for the master control terminal, the above-mentioned method also includes a following step, in which the touch operation on the graphical user interface of the master control terminal is monitored in response to a start command for the master toolkit. After receiving the master toolkit pushed by the service device, the master control terminal can respond to the above start command. For example, the service device and the master control terminal can be connected via the USB, and then the master toolkit can be pushed to the master control terminal by the service device.

In some implementations, the above-mentioned master toolkit deployed on the master control terminal is generally implemented based on C language. After the service device pushes the master toolkit to the master control terminal and starts the master toolkit, the master control terminal can monitor the touch operation on the graphical user interface of the master control terminal, so that the master control terminal can respond to the touch operation, and then executes above steps S102 and S104.

In actual use, monitoring of the touch operation on the graphical user interface of the master control terminal through the master toolkit is realized by monitoring a character device file of the master control terminal. This is because when the user performs the touch operation on the graphical user interface, the operation event generated by the touch operation can cause changes in the character device file of the master control terminal, so as to record the operation event. Therefore, if the character device file changes, occurrence of the touch operation on the graphical user interface of the master control terminal can be determined.

In some implementations, the above-mentioned character device file is usually saved in a system directory of an Android system /dev/input/, which contains multiple types of character device files. In embodiments of the present disclosure, the character device file being monitored is the character device file for multi-touch, so as to facilitate the parsing of the character device file and the obtaining of relevant attributes of the master control terminal, such as a maximum height, a maximum width, a minimum pressure value and a maximum pressure value of the graphical user interface, so as to facilitate the generation of subsequent operation protocol packages.

Furthermore, in consideration that intelligent terminals of an Android system usually follow certain multi-touch protocols, the operation event generated when the master control terminal responds to the touch operation will also conform to a format corresponding to the multi-touch protocols.

There are two current kinds of multi-touch protocols: a TypeA protocol and a TypeB protocol. The TypeA protocol is a stateless multi-touch protocol, and the TypeB protocol is a stateful multi-touch protocol. The TypeA protocol and the TypeB protocol are also called Class A protocol and Class B protocol, respectively. The main difference between the two is that Class B protocol uses ID to identify a touch point, which reduces the data amount reported to a user space. Class B protocol requires ABS_MT_TRACKING_ID, which may generate an ABS_MT_SLOT event. Therefore, when determining the type of the multi-touch protocol of the master control terminal, whether the multi-touch protocol of the master control terminal is the TypeA protocol or the TypeB protocol can be determined based on whether the multi-touch character device file supports the ABS_MT_SLOT command.

In some embodiments, in above step S102 of embodiments of the present disclosure, a step of converting the operation event corresponding to the touch operation into the operation protocol package through the master toolkit further includes following steps: whether a type of a multi-touch protocol of the master control terminal is a second protocol type is determined, and the operation protocol package is generated based on the master toolkit and the operation event corresponding to the touch operation in response to the type of the multi-touch protocol of the master control terminal being the second protocol type. In embodiments of the present disclosure, the second protocol type is a stateful multi-touch protocol type, that is, the TypeB protocol, or the protocol type corresponding to the Class B protocol.

In some embodiments, if the type of the multi-touch protocol of the master control terminal is a first protocol type, that is, the TypeA protocol, or the protocol type corresponding to the Class A protocol, the operation event corresponding to the touch operation needs to be converted to an operation event corresponding to the second protocol type, and then the operation protocol package is generated based on the master toolkit and the operation event corresponding to the second protocol type.

In some embodiments, a step of generating the operation protocol package further includes following steps: the operation event is extracted from a character device file of the master control terminal through the master toolkit; a coordinate point and a pressure value contained in an extracted operation event are normalized; and the operation protocol package is generated according to a normalized operation event.

In specific implementations, a process of determining the type of the multi-touch protocol of the master control terminal is usually implemented in a start process of the master toolkit. After the service device pushes the master toolkit to the master control terminal, it is also necessary to start the master toolkit, so as to convert the operation event corresponding to the touch operation into the operation protocol package through the master toolkit, in addition to rendering the graphical user interface according to the touch operation, when the master control terminal responds to the touch operation.

In some embodiments, when the master toolkit is started, an operation command set supported by the type of the multi-touch protocol of the master control terminal can also be obtained, such as ABS_MT_SLOT, ABS_MT_TRACKING_ID, BTN_TOUCH, ABS_MT_TOUCH_MAJOR, ABS_MT_WIDTH_MAJOR, ABS_MT_PRESSURE, etc. Meanwhile, the multi-touch character device file is monitored. If the content of the multi-touch character device file changes, it indicates that the user has performed some touch operations on the graphical user interface of the master control terminal. Next, whenever the user performs the touch operations, the master toolkit will generate the operation protocol package from the operation event corresponding to the touch operation, and then send the operation protocol package through messages.

Figure 3:
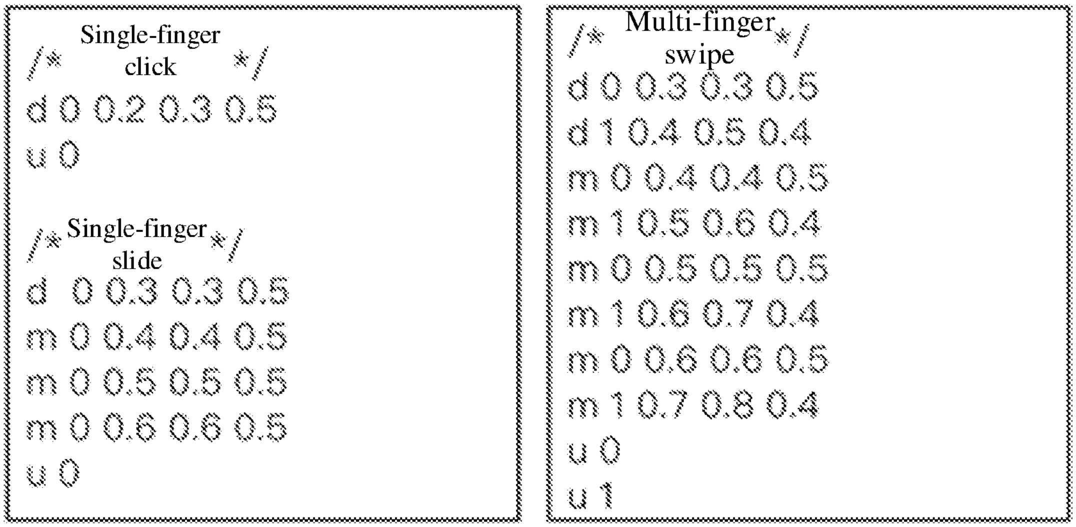
FIG. 3 is a schematic diagram of an operation protocol package provided by embodiments of the present disclosure.

In some embodiments, FIG. 3 shows a schematic diagram of an operation protocol package, and FIG. 3 shows the operation protocol package generated by the normalized operation event, including a single-finger click event, a single-finger slide event and a multi-finger swipe event. Normalized parameters used in the normalization processing can be parsed from the character device file, such as the maximum height, the maximum width, the minimum pressure value, the maximum pressure value and other parameters of the graphical user interface mentioned above. Further, in FIG. 3, that 'd 0 0.2 0.3 0.5' means: a first item 'd' represents 'down', indicating a press operation of the finger, a second item '0' represents a first finger, a third item '0.2' represents a normalized horizontal coordinate, a fourth item '0.3' represents a normalized vertical coordinate, and a fifth item '0.5' represents a normalized pressure value. That 'm 0 0.4 0.4 0.5' means: a first item 'm' represents a move operation of the finger, and other items refer to the same as the items in the press operation (down), which will not be repeated. The 'u 0' means: a first item 'u' represents 'up', indicating a lift operation of the finger, and a second item '0' represents the first finger.

After the operation protocol package shown in above FIG. 3 is sent to the slave control terminal through a message, the relevant process of the master control terminal is ended.

Figure 4:
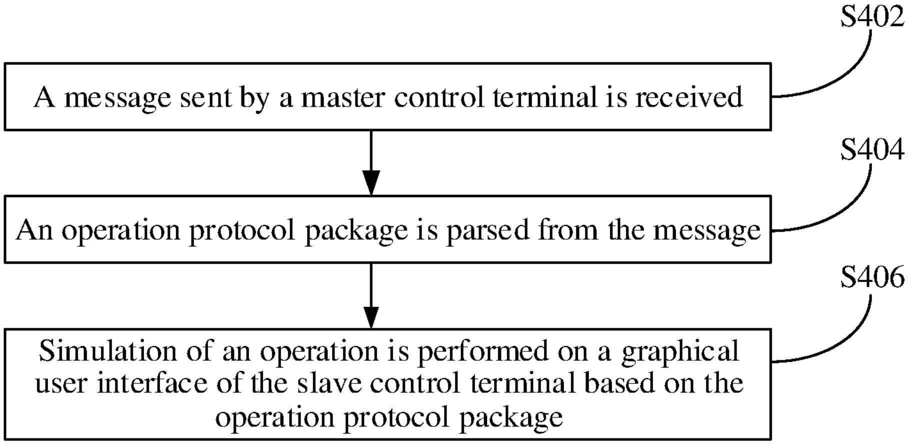
FIG. 4 is a flow chart of another one-machine multi-control method provided by embodiments of the present disclosure.

In some embodiments, on the basis of above FIG. 1, embodiments of the present disclosure also provides a one-machine multi-control method. The method is applied to a slave control terminal, and the slave control terminal is deployed with a slave toolkit. In some embodiments, the slave control terminal is connected with the master control terminal. Both the master control terminal and the slave control terminal are mobile terminals installed with an Android system, and the master control terminal is deployed with a master toolkit. As shown in FIG. 4, another one-machine multi-control method includes following steps.

In a step S402, a message sent by a master control terminal is received.

The message carries the operation protocol package corresponding to the touch operation on the master control terminal.

That the ZeroMQ functional module being provided in both the master toolkit and the slave toolkit is taken as an example. The master control terminal and the slave control terminal can establish a ZeroMQ connection. The message sent by the master control terminal is the ZeroMQ message carrying the operation protocol package. The message sent by the master control terminal received by the slave control terminal is also the ZeroMQ message carrying the operation protocol package. After receiving the message, the slave control terminal can perform following steps, to parse the ZeroMQ message.

In a step S404, an operation protocol package is parsed from the message.

In a step S406, simulation of an operation is performed on a graphical user interface of the slave control terminal based on the operation protocol package.

In some embodiments, a step of performing simulation of the operation on the graphical user interface of the slave control terminal includes: an operation event carried in the operation protocol package is extracted, the operation event is written to a character device file of the slave control terminal to update the character device file of the slave control terminal; and the simulation of the operation is performed on the graphical user interface of slave control terminal based on a slave toolkit and an updated character device file.

In actual use, since the operation protocol package is generated by the master control terminal in combination with the multi-touch protocol, it is also necessary to combine a type of the multi-touch protocol of the current slave control terminal when extracting the operation event carried in the operation protocol package. Therefore, when extracting the operation events carried in the operation protocol package, it is necessary to obtain the type of the multi-touch protocol of the current slave control terminal. If the type of the multi-touch protocol is a second protocol type, an operation event corresponding to the second protocol type is extracted from the operation protocol package. Herein, the second protocol type is the stateful multi-touch protocol type described in preceding embodiments.

In some embodiments, if the type of the multi-touch protocol is the first protocol type, an operation event corresponding to the first protocol type is extracted from the operation protocol package. Herein, the first protocol type is the stateless multi-touch protocol type described in preceding embodiments.

For example, parsing of the ZeroMQ message is taken as an example, after receiving through the ZeroMQ message the operation protocol package sent by the master control terminal, the slave control terminal can convert the operation protocol package received into different types of operation events according to the type of the multi-touch protocol (TypeA or TypeB) of the slave control terminal, and then write the operation event to the character device file of the slave control terminal to simulate the user's operations. The operation on the slave control terminal and the operation on the master control terminal are consistent, so that the master control terminal can control the slave control terminal. In this way, the one-machine multi-control scheme is realized.

In actual use, since the Android system, especially the Android system of version 10, in which strict restrictions have been made on system permissions, the slave control terminal can be generally implemented in two ways. For a system below Android 10, C language and technology such as driving an underlying multi-touch character device file are used for implementation. For a system above Android 10, Java language is used to call a multi-touch API (Application Programming Interface) under the Android standard for implementation.

In the one-machine multi-control method shown in FIG. 4, it usually involves a handling process of the slave control terminal whose operating system is below Android 10. If an Android system version of the slave control terminal is an operating system of a preset version, for example, the operating system is above Android 10, when receiving the operation protocol package, a rotation direction of the graphical user interface of the slave control terminal can be obtained, a coordinate transformation is performed, according to the rotation direction, on the operation protocol package received, and simulation of an operation is performed on the graphical user interface of the slave control terminal based on a transformed operation protocol package by calling a preset application. This is because Android 10 and above has strict permission control over the underlying character device file, and cannot write to the character device file. Therefore, the slave toolkit of the slave control terminal of Android 10 and above will not write the operation event to the character device file of the slave control terminal, and only need to monitor a screen rotation of the slave control terminal. The coordinate transformation is then performed on the operation protocol package received according to a screen rotation direction, and the Android API, such as an event API MotionEvent.obtain, is finally called to simulate the user's operations, the implementation principle of which is relatively simple.

In actual use, the above-mentioned slave toolkit is also pre deployed through the service device. In addition, when deploying the slave toolkit, the service device will automatically obtain an Android version of the slave control terminal, so as to push a matching slave toolkit to the slave control terminal.

Therefore, the above-mentioned one-machine multi-control method applied to the slave control terminal also includes the following process: the messages sent by the master control terminal is monitored in response to a start command for the slave toolkit. The slave control terminal also needs to first receive the slave toolkit pushed by the service device, so as to perform the method shown in FIG. 4 when the message sent by the master control terminal is received. The service device and the slave control terminal can also be connected via USB, and the slave toolkit is then pushed to the slave control terminal.

Figure 5:
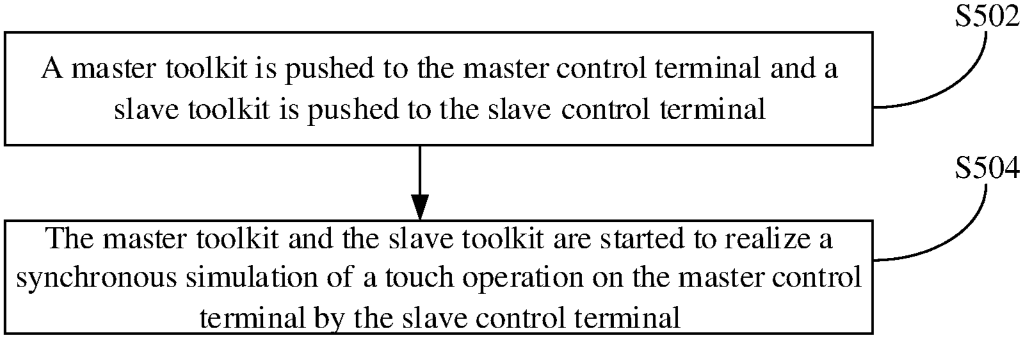
FIG. 5 is the flow chart of another one-machine multi-control method provided by embodiments of the present disclosure.

In some embodiments, in order to facilitate the understanding of the one-machine multi-control method provided by embodiments of the present disclosure, on the basis of FIGS. 1 and 4, another one-machine multi-control method is also provided by embodiments of the present disclosure. The method is applied to a service device, and the service device is connected with the master control terminal and the slave control terminal through USB. FIG. 5 is the flow chart of another one-machine multi-control method provided by embodiments of the present disclosure, which describes the deployment of one-machine multi-control method under an Android system from the perspective of the service device. As shown in FIG. 5, the method includes following steps.

In a step S502, a master toolkit is pushed to the master control terminal and a slave toolkit is pushed to the slave control terminal.

The master toolkit and the slave toolkit are used to establish the communication connection.

In a step S504, the master toolkit and the slave toolkit are started to realize a synchronous simulation of a touch operation on the master control terminal by the slave control terminal.

In some implementations, the service device can be a desktop, a laptop, a handheld computer and other terminal devices with arbitrary configuration. Generally, the windows operating system is required on the service device, and corresponding application software is usually run on the service device, so that when the master control terminal or the slave control terminal is connected the service device through USB, an effective communication connection can be established.

In actual use, for the terminal devices connected to the service device via USB, a device list can be displayed on the service device. The user can select one of the terminal devices as the master control terminal. When the master control terminal is selected, the rest of the terminal devices will be used as the slave control terminal(s). When the master control terminal and the slave control terminal are determined, the service device can push the pre stored master toolkit and slave toolkit to corresponding master control terminal and slave control terminal respectively to deploy an environment for one-machine multi-control.

In some embodiments, when the master toolkit is pushed to the master control terminal, it is necessary to obtain the device information and an IP address of the master control terminal. The IP address of the master control terminal is saved, and the master toolkit of the master control terminal is obtained according to the device information, and then the master toolkit is pushed to the master control terminal. The IP address of the master control terminal is used to establish the communication connection, such as the ZeroMQ connection, between the master control terminal and the slave control terminal.

The master toolkit is usually a binary file package, which can be pushed to a preset directory of the master control terminal by the service device. Generally, for an Android system, the master toolkit can be pushed to a directory of the Android system /data/local/tmp/.

In some embodiments of the present disclosure, the above-mentioned device information refers to the serial number of the master control terminal and ADB (Android Debug Bridge) status information. In some embodiments, in addition to above serial number and ADB status information, the hardware information, operating system version and other information of the master control terminal can also be obtained. Specific device information can be obtained according to actual needs, and embodiments of the present disclosure do not limit this.

In some embodiments, when the slave kit is pushed to the slave control terminal, the device information and an IP address of the slave control terminal can be obtained. The IP address of the slave control terminal is saved, and the slave toolkit matching a system version of the slave control terminal is obtained according to the device information of the slave control terminal, and then the slave toolkit is pushed to the slave control terminal.

In addition, when the master toolkit and the slave toolkit are deployed, a real-time running log can also be displayed on the service device. The running log is used to record the information of each stage of the deployment of the master control terminal and the slave control terminal, so that users can view the deployment of each terminal. In case of errors reported during the deployment process, it can also facilitate the troubleshooting of errors.

After the master control terminal and the slave control terminal are deployed respectively, the USB connection between the master control terminal and the slave control terminal and the service device can be disconnected, so that the master control terminal and the slave control terminal are in the same local area network. The user can operate the master control terminal according to the method shown in above FIGS. 1 and 4, and then view the display effect of the slave control terminal, so as to realize the automatic process of one-machine multi-control.

According to embodiments, the deployment process of the one-machine multi-control scheme under the Android system through the service device does not require additional hardware costs, which only requires a number of terminal phones installed with an Android system and a common computer installed with Windows. For users, the whole process has good scalability. As a result, terminal devices of different models, resolutions, and system versions can be compatible. In addition, when the one-machine multi-control is conducted, the multi-touch protocols of TypeA and TypeB can be fully compatible, and all multi-touch operations can also be supported. According to embodiments, a one-click operation can be achieved through the service device, so that deployments of the master control terminal and all slave control terminals can be achieved, which does not require additional hardware costs.

The above-mentioned one-machine multi-control method also includes following advantages.

(1) A high-performance ZeroMQ publish and subscribe mode is used as the data transmission mode, which has good scalability. The number of slave control terminals can be infinitely expanded without any impact on performance.

(2) The operation instruction is parsed based on C language and standard API, which can directly read and write the character device file of an Android system, with extremely high performance, minimal latency (about 1-5 ms) and good user experience.

(3) In the master control terminal, since the master toolkit directly converts the TypeA protocol to the TypeB protocol, the scheme is fully compatible with TypeA and TypeB multi-touch protocols, supports all multi-touch operations, and is completely transparent to users. In actual use, the users do not need to care about the multi-touch protocol of the master control terminal.

Figure 6:
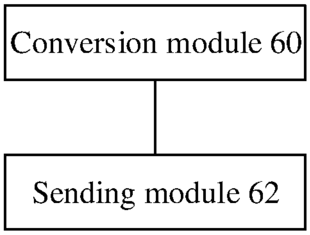
FIG. 6 is a schematic structural diagram of a one-machine multi-control apparatus provided by embodiments of the present disclosure.

A one-machine multi-control apparatus is also provided by embodiments of the present disclosure, in correspondence to the one-machine multi-control method shown in FIG. 1. The apparatus is applied to a master control terminal, and the master control terminal is deployed with a master toolkit. The master control terminal is connected with at least one slave control terminal. The master control terminal and the slave control terminal are mobile terminals installed with an Android system, and the slave control terminal is deployed with a slave toolkit. As shown in FIG. 6, the one-machine multi-control apparatus includes a conversion module and a sending module.

The conversion module 60 is configured to convert, in response to a touch operation on a graphical user interface of a master control terminal, an operation event corresponding to a touch operation into an operation protocol package through a master toolkit.

The sending module 62 is configured to send a message to the slave control terminal, the message carrying the operation protocol package, to trigger the slave control terminal to perform through a slave toolkit the touch operation based on the operation protocol package.

Figure 7:
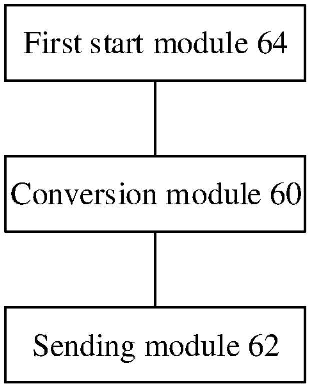
FIG. 7 is a schematic structural diagram of another one-machine multi-control apparatus provided by embodiments of the present disclosure.

In some embodiments, on the basis of FIG. 6, FIG. 7 also shows a schematic structural diagram of another one-machine multi-control apparatus. In addition to the structure shown in FIG. 6, the apparatus further includes a first start module.

The first start module 64 is configured to monitor, in response to a start command for the master toolkit, the touch operation on the graphical user interface of the master control terminal.

In some embodiments, the first start module 64 is further configured to monitor a character device file of the master control terminal; and determine, in response to a change in the character device file, occurrence of the touch operation on the graphical user interface of the master control terminal.

In some embodiments, the above-mentioned conversion module is further configured to determine whether a type of a multi-touch protocol of the master control terminal is a second protocol type; and generate, in response to the type of the multi-touch protocol of the master control terminal being the second protocol type, the operation protocol package based on the master toolkit and the operation event corresponding to the touch operation.

In some embodiments, the above-mentioned conversion module is further configured to convert, in response to the type of the multi-touch protocol of the master control terminal being a first protocol type, the operation event corresponding to the touch operation to an operation event corresponding to the second protocol type, wherein the first protocol type is a stateless multi-touch protocol type; and generate the operation protocol package based on the master toolkit and the operation event corresponding to the second protocol type.

In some embodiments, a step of generating the operation protocol package based on the master toolkit and the operation event corresponding to the touch operation includes: extracting the operation event from a character device file of the master control terminal through the master toolkit; normalizing a coordinate point and a pressure value contained in an extracted operation event; and generating the operation protocol package according to a normalized operation event.

Figure 8:
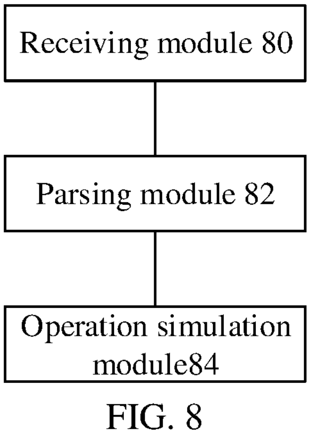
FIG. 8 is a schematic structural diagram of another one-machine multi-control apparatus provided by embodiments of the present disclosure.

Another one-machine multi-control apparatus is also provided by embodiments of the present disclosure, in correspondence to the one-machine multi-control method shown in FIG. 4. The apparatus is applied to a slave control terminal, and the slave control terminal is deployed with a slave toolkit. The slave control terminal is connected with a master control terminal. The master control terminal and the slave control terminal are mobile terminals installed with an Android system, and the master control terminal is deployed with a master toolkit. As shown in FIG. 8, the one-machine multi-control apparatus includes a receiving module, a parsing module and an operation simulation module.

The receiving module 80 is configured to receive a message sent by the master control terminal, wherein the message carries an operation protocol package corresponding to a touch operation on the master control terminal.

The parsing module 82 is configured to parse the operation protocol package from the message.

The operation simulation module 84 is configured to perform simulation of an operation on a graphical user interface of the slave control terminal based on the operation protocol package.

In some embodiments, the operation simulation module 84 is further configured to extract an operation event carried in the operation protocol package, and write the operation event to a character device file of the slave control terminal, to update the character device file of the slave control terminal; and perform the simulation of the operation on the graphical user interface of the slave control terminal based on the slave toolkit and an updated character device file.

In some embodiments, the operation simulation module 84 is further configured to obtain a type of a multi-touch protocol of the slave control terminal; and extract, in response to the type of the multi-touch protocol being a second protocol type, an operation event corresponding to the second protocol type, wherein the second protocol type is a stateful multi-touch protocol type.

In some embodiments, the operation simulation module 84 is further configured to extract, in response to the type of the multi-touch protocol being a first protocol type, an operation event corresponding to the first protocol type, wherein the first protocol type is a stateless multi-touch protocol type.

In some embodiments, the operation simulation module 84 is further configured to obtain, in response to an Android system version of the slave control terminal being an operating system of a preset version, a rotation direction of the graphical user interface of the slave control terminal; and perform, according to the rotation direction, a coordinate transformation on the operation protocol package received, and perform the simulation of the operation on the graphical user interface of the slave control terminal based on a transformed operation protocol package by calling a preset application.

Figure 9:
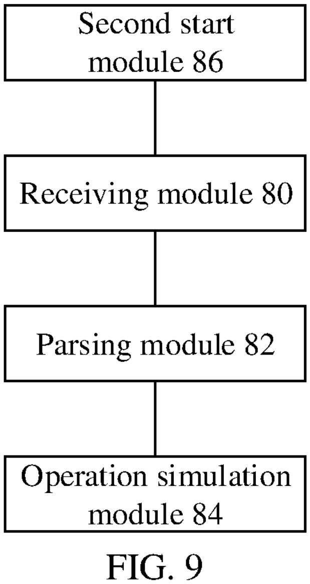
FIG. 9 is a schematic structural diagram of another one-machine multi-control apparatus provided by embodiments of the present disclosure.

In some embodiments, on the basis of FIG. 8, FIG. 9 also shows a schematic structural diagram of another one-machine multi-control apparatus. In addition to the structure shown in FIG. 8, the apparatus further includes a second start module.

The second start module 86 is configured to monitor, in response to a start command for the slave toolkit, the message sent by the master control terminal.

The implementation principle and technical effect of the one-machine multi-control apparatus provided by embodiments of the present disclosure are the same as those of the above method embodiments. For a brief description, where the apparatus embodiments are not mentioned, the corresponding content of the above method embodiments can be referred to, and will not be repeated here.

In some embodiments, embodiments of the present disclosure also provides a one-machine multi-control system, which includes a service device, a master control terminal and a slave control terminal. The service device is communicated with the master control terminal and the slave control terminal. The master control terminal is configured with the apparatus shown in FIG. 6 or 7, and the slave control terminal is configured with the apparatus shown in FIG. 8 or 9.

The service device is configured to push a master toolkit to the master control terminal and a slave toolkit to the slave control terminal; and start the master toolkit and the slave toolkit to realize synchronous simulation of a touch operation on the master control terminal by the slave control terminal.

In some embodiments, the service device can obtain the device information and an IP address of the master control terminal. The IP address of the master control terminal is saved, and the master toolkit of the master control terminal is obtained according to the device information, and then the master toolkit is pushed to the master control terminal. The IP address of the master control terminal is used to establish a connection between the master control terminal and the slave control terminal.

In some embodiments, the service device can also obtain the device information and an IP address of the slave control terminal. The IP address of the slave control terminal is saved, and the slave toolkit matching a system version of the slave control terminal is obtained according to the device information of the slave control terminal, and then the slave toolkit is pushed to the slave control terminal.

In some embodiments, embodiments of the present disclosure also provide an electronic device, including a memory, a processor, and a computer program stored in the memory and capable of running on the processor. The processor is configured to implement the one-machine multi-control method when executing the computer program.

Figure 10:
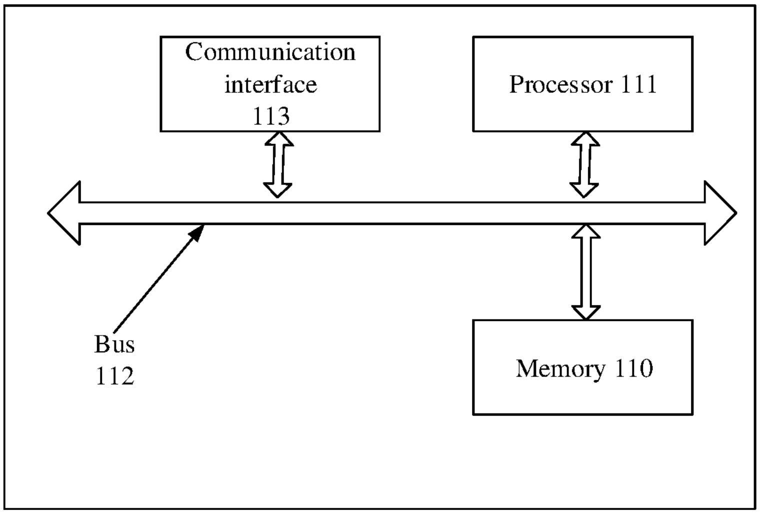
FIG. 10 is a schematic structural diagram of an electronic device provided by embodiments of the present disclosure.

Embodiments of the present disclosure also provide an electronic device, as shown in FIG. 10, which is a structural diagram of the electronic device. The electronic device includes a processor 111 and a memory 110. The memory 110 stores computer executable instructions that can be executed by the processor 111. The processor 111 executes the computer executable instructions to realize the above one-machine multi-control method.

In embodiments shown in FIG. 10, the electronic device also includes a bus 112 and a communication interface 113, wherein the processor 111, the communication interface 113 and the memory 110 are connected through the bus 112.

The memory 110 may include high-speed random access memory (RAM), and may also include non-volatile memory, such as at least one disk memory. The communication connection between the system network element and at least one other network element is realized through at least one communication interface 113 (which can be wired or wireless), where Internet, WAN, LAN, MAN, etc., can be used. A bus 112 can be ISA (Industry Standard Architecture) bus, PCI (Peripheral Component Interconnect) bus or EISA (Extended Industry Standard Architecture) bus. The bus 112 can be divided into address bus, data bus, control bus, etc. For ease of representation, only one bidirectional arrow is used in FIG. 10, but it does not mean that there is only one bus or one type of bus.

The processor 111 may be an integrated circuit chip with signal processing capability. In the implementation process, each step of the above method can be completed by the integrated logic circuit of hardware or instructions in the form of software in the processor 111. The above processor 111 can be a general-purpose processor, including a central Processing unit (CPU), a network Processor (NP), etc. It can also be Digital Signal Processor (DSP for short), Application Specific Integrated Circuit (ASIC for short), Field programmable Gate Array (FPGA for short) or other Programmable logic devices, discrete gates or transistor logic devices, discrete hardware components. A general-purpose processor may be a microprocessor or the processor may also be any conventional processor or the like. The steps of the method disclosed in combination with the embodiments of the present disclosure can be directly embodied in the completion of the hardware decoding processor or the combination of hardware and software modules in the decoding processor. Software modules can be located in RAM, flash memory, read-only memory, programmable read-only memory or electrically erasable programmable memory, registers and other mature storage media in the field. The storage medium is located in the memory, and the processor 111 reads the information in the memory and completes the steps of the one-machine multi-control method with its hardware.

The embodiments of the present disclosure also provide a computer-readable storage medium, on which a computer program is stored, and when the computer program is run by a processor, the method of multi control on one computer is executed.

The computer program product of the one-machine multi-control method, device, system and electronic equipment provided by embodiments of the present disclosure includes a computer-readable storage medium that stores program code. The instructions included in the program code can be used to execute the method described in the preceding method embodiment. For specific implementation, refer to the method embodiment, and will not be repeated here.

Those skilled in the art can clearly understand that, for the convenience and simplicity of description, the specific working process of the above described systems and devices can refer to the corresponding process in the above method embodiments, and will not be repeated here.

In addition, in the description of the embodiments of the present disclosure, unless otherwise specified and defined, the terms “installation”, “connection” and “connection” should be understood broadly, for example, they can be fixed connection, removable connection, or integrated connection; It can be mechanical connection or electrical connection; It can be directly connected, or indirectly connected through intermediate media. It can be the connection between two components. For those skilled in the art, the specific meaning of the above terms in this disclosure can be understood in specific cases.

If the functions are realized in the form of software functional units and sold or used as independent products, they can be stored in a computer readable storage medium. Based on this understanding, the technical solution of the present disclosure can be embodied in the form of a software product, which is stored in a storage medium, A number of instructions are included to enable a computer device (which may be a personal computer, a server, or a network device, etc.) to perform all or part of the steps of the method described in various embodiments of the present disclosure. The aforementioned storage media include: USB flash disk, mobile hard disk, read only memory (ROM), random access memory (RAM), magnetic disc or optical disc and other media that can store program codes.

In the description of the present disclosure, it should be noted that the terms “center”, “top”, “bottom”, “left”, “right”, “vertical”, “horizontal”, “inside”, “outside”, etc. indicate the orientation or position relationship based on the orientation or position relationship shown in the drawings, only for the convenience of describing the present disclosure and simplifying the description, rather than indicating or implying that the device or element referred to must have a specific orientation It is constructed and operated in a specific orientation, and therefore cannot be understood as a limitation of the present disclosure. In addition, the terms “first”, “second” and “third” are only used for describing purposes and cannot be understood as indicating or implying relative importance.

Finally, it should be noted that the above embodiments are only specific embodiments of the disclosure to illustrate the technical solutions of the disclosure, rather than limit them. The scope of protection of the disclosure is not limited to this. Although the disclosure has been described in detail with reference to the aforementioned embodiments, those skilled in the art should understand that: any person skilled in the technical field is within the scope of the disclosure, It can still modify or easily think of changes to the technical solutions recorded in the aforementioned embodiments, or equivalently replace some of the technical features; However, these modifications, changes or substitutions do not make the nature of the corresponding technical solutions deviate from the spirit and scope of the technical solutions of the embodiments of the present disclosure, and should be covered in the scope of protection of the present disclosure. Therefore, the protection scope of the disclosure shall be subject to the protection scope of the claims.

What is claimed is:

1. A one-machine multi-control method, applied to a master control terminal, wherein the master control terminal is deployed with a master toolkit, the master control terminal is connected with at least one slave control terminal, both the master control terminal and the slave control terminal are mobile terminals installed with an Android system, and the slave control terminal is deployed with a slave toolkit, the method comprising:

converting, in response to a touch operation on a graphical user interface of the master control terminal, an operation event corresponding to the touch operation into an operation protocol package through the master toolkit; and sending a message to the slave control terminal, the message carrying the operation protocol package, to trigger the slave control terminal to perform through the slave toolkit the touch operation based on the operation protocol package;

wherein a step of converting an operation event corresponding to the touch operation into an operation protocol package through the master toolkit comprises:

generating the operation protocol package based on the master toolkit and the operation event corresponding to the touch operation; and wherein a step of generating the operation protocol package based on the master toolkit and the operation event corresponding to the touch operation comprises:

extracting the operation event from a first character device file of the master control terminal through the master toolkit;

normalizing a coordinate point and a pressure value contained in an extracted operation event based on a normalization parameter, wherein the normalization parameter comprises at least one of a maximum height of the graphical user interface, a maximum width of the graphical user interface, a minimum pressure value, or a maximum pressure value; and generating the operation protocol package according to a normalized operation event.

2. The method according to claim 1, wherein the step of converting an operation event corresponding to the touch operation into an operation protocol package through the master toolkit further comprises:

determining whether a type of a multi-touch protocol of the master control terminal is a second protocol type; and generating, in response to the type of the multi-touch protocol of the master control terminal being the second protocol type, the operation protocol package based on the master toolkit and the operation event corresponding to the touch operation;

wherein the second protocol type is a stateful multi-touch protocol type.

3. The method according to claim 2, wherein the step of converting an operation event corresponding to the touch operation into an operation protocol package through the master toolkit further comprises:

converting, in response to the type of the multi-touch protocol of the master control terminal being a first protocol type, the operation event corresponding to the touch operation to an operation event corresponding to the second protocol type, wherein the first protocol type is a stateless multi-touch protocol type; and generating the operation protocol package based on the master toolkit and the operation event corresponding to the second protocol type.

4. The method according to claim 1, wherein the message sent to the slave control terminal comprises a ZeroMQ message carrying the operation protocol package.

5. A one-machine multi-control method, applied to a slave control terminal, wherein the slave control terminal is deployed with a slave toolkit, the slave control terminal is connected with a master control terminal, both the master control terminal and the slave control terminal are mobile terminals installed with an Android system, and the master control terminal is deployed with a master toolkit, the method comprising:

receiving a message sent by the master control terminal, the message carrying an operation protocol package corresponding to a touch operation on the master control terminal;

parsing the operation protocol package from the message; and performing simulation of an operation on a graphical user interface of the slave control terminal based on the operation protocol package;

wherein the operation protocol package is generated based on the master toolkit and an operation event corresponding to the touch operation on the master control terminal; and wherein a step of generating the operation protocol package based on the master toolkit and the operation event corresponding to the touch operation comprises:

extracting the operation event from a first character device file of the master control terminal through the master toolkit;

normalizing a coordinate point and a pressure value contained in an extracted operation event based on a normalization parameter, wherein the normalization parameter comprises at least one of a maximum height of the graphical user interface, a maximum width of the graphical user interface, a minimum pressure value, or a maximum pressure value; and generating the operation protocol package according to a normalized operation event.

6. The method according to claim 5, wherein a step of performing simulation of an operation on a graphical user interface of the slave control terminal based on the operation protocol package further comprises:

obtaining, in response to an Android system version of the slave control terminal being an operating system of a preset version, a rotation direction of the graphical user interface of the slave control terminal; and performing, according to the rotation direction, a coordinate transformation on the operation protocol package received, and performing the simulation of the operation on the graphical user interface of the slave control terminal based on a transformed operation protocol package by calling a preset application.

7. The method according to claim 5, further comprising:

monitoring, in response to a start command for the slave toolkit, the message sent by the master control terminal.

8. The method according to claim 5, wherein the message received sent by the master control terminal comprises a ZeroMQ message carrying the operation protocol package.

9. A one-machine multi-control system, comprising a service device, and further a master control terminal and a slave control terminal, wherein the service device is communicated with the master control terminal and the slave control terminal; wherein the master control terminal is deployed with a master toolkit, and the master control terminal is connected with at least one slave control terminal; and wherein the slave control terminal is deployed with a slave toolkit, and the slave control terminal is connected with a master control terminal; both the master control terminal and the slave control terminal are mobile terminals installed with an Android system;

the master control terminal is configured with a one-machine multi-control apparatus comprising:

a conversion module configured to convert, in response to a touch operation on a graphical user interface of the master control terminal, an operation event corresponding to a touch operation into an operation protocol package through the master toolkit; and a sending module configured to send a message to the slave control terminal, the message carrying the operation protocol package, to trigger the slave control terminal to perform through the slave toolkit the touch operation based on the operation protocol package;

the conversion module being further configured to generate the operation protocol package based on the master toolkit and the operation event corresponding to the touch operation;

the slave control terminal is configured with a one-machine multi-control apparatus comprising:

a receiving module configured to receive the message sent by the master control terminal, wherein the message carries the operation protocol package corresponding to the touch operation on the master control terminal, and the operation protocol package is generated based on the master toolkit and the operation event corresponding to the touch operation on the master control terminal;

a parsing module configured to parse the operation protocol package from the message; and an operation simulation module configured to perform simulation of an operation on a graphical user interface of the slave control terminal based on the operation protocol package;

and the service device is configured to push the master toolkit to the master control terminal and the slave toolkit to the slave control terminal, and start the master toolkit and the slave toolkit to realize synchronous simulation of the touch operation on the master control terminal by the slave control terminal;

wherein a step of generating the operation protocol package based on the master toolkit and the operation event corresponding to the touch operation comprises:

extracting the operation event from a first character device file of the master control terminal through the master toolkit;

normalizing a coordinate point and a pressure value contained in an extracted operation event based on a normalization parameter, wherein the normalization parameter comprises at least one of a maximum height of the graphical user interface, a maximum width of the graphical user interface, a minimum pressure value, or a maximum pressure value; and generating the operation protocol package according to a normalized operation event.

10. The system according to claim 9, wherein the service device is further configured to obtain device information and an IP address of the master control terminal, and obtain the master toolkit of the master control terminal according to the device information, wherein the IP address of the master control terminal is used to establish a connection between the master control terminal and the slave control terminal.

11. The system according to claim 9, wherein the service device is further configured to obtain device information and an IP address of the slave control terminal, and obtain the slave toolkit matching a system version of the slave control terminal according to the device information of the slave control terminal.

12. The system according to claim 9, wherein the one-machine multi-control apparatus configured in the master control terminal further comprises a first start module, and the first start module is configured to monitor, in response to a start command for the master toolkit, the touch operation on the graphical user interface of the master control terminal.

13. The system according to claim 9, wherein the conversion module is further configured to:

determine whether a type of a multi-touch protocol of the master control terminal is a second protocol type; and generate, in response to the type of the multi-touch protocol of the master control terminal being the second protocol type, the operation protocol package based on the master toolkit and the operation event corresponding to the touch operation;

wherein the second protocol type is a stateful multi-touch protocol type.

14. The system according to claim 9, wherein the conversion module is further configured to:

convert, in response to the type of the multi-touch protocol of the master control terminal being a first protocol type, the operation event corresponding to the touch operation to an operation event corresponding to the second protocol type, wherein the first protocol type is a stateless multi-touch protocol type; and generate the operation protocol package based on the master toolkit and the operation event corresponding to the second protocol type.

15. The method according to claim 1, further comprising:

monitoring, in response to a start command for the master toolkit, the touch operation on the graphical user interface of the master control terminal.

16. The method according to claim 15, wherein a step of monitoring, in response to a start command for the master toolkit, the touch operation on the graphical user interface of the master control terminal comprises:

monitoring the first character device file of the master control terminal; and determining, in response to a change in the first character device file, occurrence of the touch operation on the graphical user interface of the master control terminal.

17. The method according to claim 5, wherein a step of performing simulation of an operation on a graphical user interface of the slave control terminal based on the operation protocol package comprises:

extracting an operation event carried in the operation protocol package, and writing the operation event to a second character device file of the slave control terminal, to update the second character device file of the slave control terminal; and performing the simulation of the operation on the graphical user interface of the slave control terminal based on the slave toolkit and an updated second character device file.

18. The method according to claim 17, wherein a step of extracting an operation event carried in the operation protocol package comprises:

obtaining a type of a multi-touch protocol of the slave control terminal; and extracting, in response to the type of the multi-touch protocol being a second protocol type, an operation event corresponding to the second protocol type, wherein the second protocol type is a stateful multi-touch protocol type.

19. The method according to claim 18, wherein the step of extracting an operation event carried in the operation protocol package further comprises:

extracting, in response to the type of the multi-touch protocol being a first protocol type, an operation event corresponding to the first protocol type, wherein the first protocol type is a stateless multi-touch protocol type.

* * * * *